No. 754,538. PATENTED MAR. 15, 1904.
F. P. BURKHARDT.
PITMAN CONNECTION FOR MOWING MACHINES.
APPLICATION FILED JULY 5, 1902.
NO MODEL.
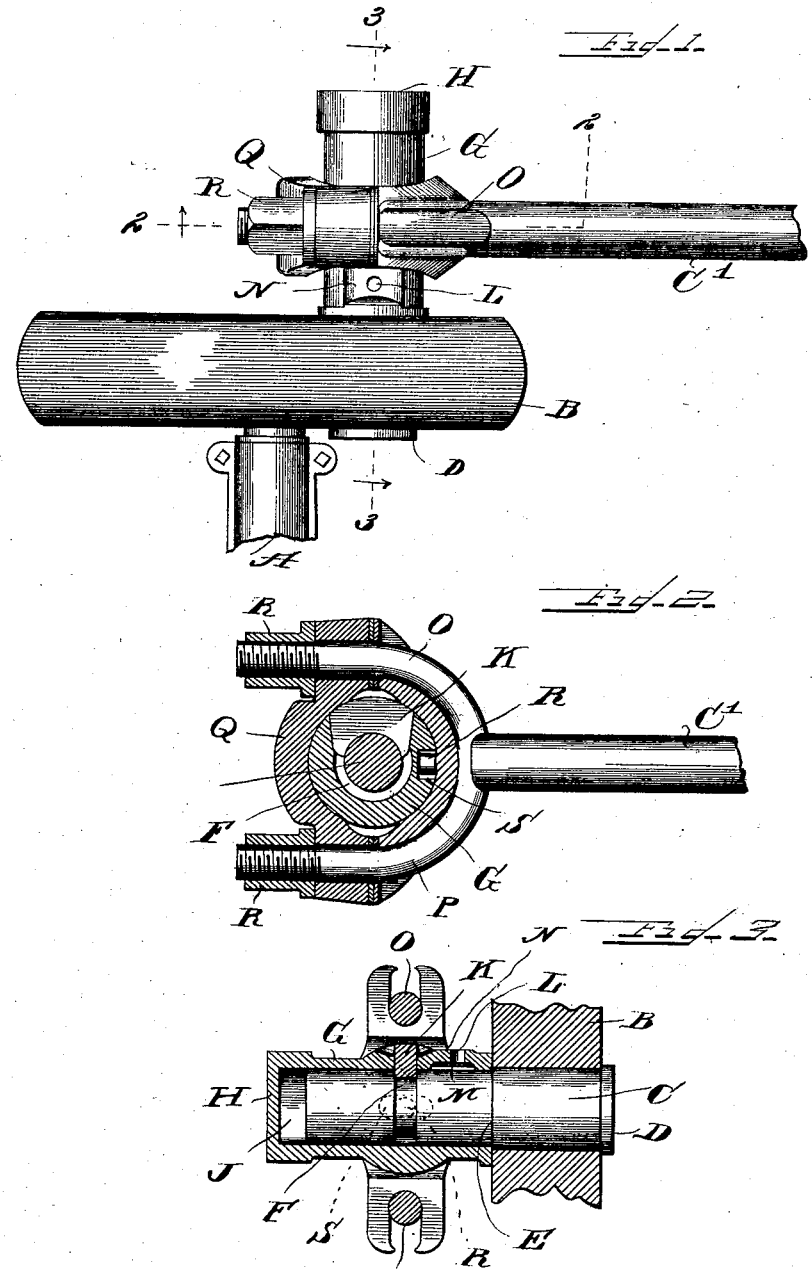
Witnesses
Inventor
Franklin P. Burkhardt
By Brown & Darby
Attys No. 754,538.

Patented March 15, 1904.

UNITED STATES PATENT OFFICE.

FRANKLIN P. BURKHARDT, OF CHICAGO, ILLINOIS, ASSIGNOR TO THE WARDER, BUSHNELL & GLESSNER COMPANY, OF CHICAGO, ILLINOIS, A CORPORATION OF OHIO.

PITMAN CONNECTION FOR MOWING-MACHINES.

SPECIFICATION forming part of Letters Patent No. 754,538, dated March 15, 1904.

Application filed July 5, 1902. Serial No. 114,397. (No model.)

*To all whom it may concern:*

Be it known that I, FRANKLIN P. BURK-HARDT, a citizen of the United States, residing at Chicago, in the county of Cook and State of Illinois, have invented a new and useful Improvement in Pitman Connections for Mowing-Machines, of which the following is a specification.

This invention relates to pitman connections for mowing-machines.

The object of the invention is to provide a construction of pitman connection which is simple and efficient in operation.

A further object of the invention is to provide a construction of pitman connection for mowing-machines in which provision is made for lubricating the parts and for retaining the lubricant in the connection.

Other objects and features of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in plan of a construction of pitman connection embodying the principles of my invention, the driving-shaft and pitman being broken off. Fig. 2 is a broken view in section on the line 2 2, Fig. 1, looking in the direction of the arrow. Fig. 3 is a broken view in section on the line 3 3, Fig. 1, looking in the direction of the arrow.

The same part is designated by the same reference-sign wherever it occurs throughout the several views.

A designates the drive-shaft of a mowing-machine, upon which is mounted the fly or balance wheel B in the usual manner. C′ designates the pitman, through which reciprocations are imparted to the cutter-bar. Only so much of these parts is shown as is necessary to show the application of the invention, and said parts may be of the usual or any suitable, convenient, or well-known construction and arrangement and embodied in any suitable, convenient, or well-known type of machine, so far as my invention is concerned, which relates to the connection of the pitman with the crank or eccentric pin carried by the fly or balance wheel B.

Heretofore it has been customary in many instances to employ a pitman having a forked end, which forked end, in connection with a cap-piece applied to such forked end, is arranged to form a bearing for a sleeve mounted upon the crank or eccentric pin of the fly or balance wheel and held thereon by a nut screwed upon the threaded end of the pin. In such constructions, however, it has been difficult to secure efficient lubrication, for the reason that any lubricant supplied to the bearing of the sleeve upon the crank-pin has been forced out through the ends of the sleeve and so wasted, and when the pitman connection is not efficiently supplied with a lubricant the machine works hard and the wear is rapid. It is among the special purposes of my present invention to overcome these objections and to provide a pitman connection in which the lubricant is efficiently retained in the crank or eccentric pin bearing-sleeve and is efficiently applied to the bearing-surface thereof.

In carrying out my invention I provide a crank or eccentric pin C and insert the same through a suitable opening formed in the fly or balance wheel B and firmly driven by hydraulic or other pressure or otherwise into place in the fly or balance wheel, said pin being preferably provided with a head or shoulder D to form a bearing against the inner or rear face of the fly or balance wheel. The projecting end of this pin is slightly turned down to a somewhat smaller diameter than the portion thereof which is received in the fly or balance wheel, thereby forming a shoulder E thereon, and about midway the length of the projecting end of said pin I form a peripheral groove F.

G designates a cap or bearing sleeve having its outer end closed, as indicated at H, and brought to a diameter adapted to receive the reduced projecting end of the crank or eccentric pin. By reason of the formation of a head D on the end of the crank-pin and the projecting end of the crank-pin beyond the wheel B being reduced, as above described, it will be seen that the crank-pin may be inserted or driven into its proper seat in the opening through the wheel B from the inside until the shoulder or head D abuts against the inner face of the wheel. With this construction it will be readily observed when it is desired to remove the crank-pin for repair or renewal or other purpose a hammer-blow upon the outer end of the pin will be sufficient to drive the pin out, and any hammer-blow required to drive or insert the pin into its seat in the opening through wheel B will be received upon the head D, thereby avoiding danger of upsetting that end of the pin upon which is carried the cap G or of otherwise bending or injuring the pin. This necessity does not exist where it is sought to drive the pin out. The inner end of the sleeve G is adapted to abut against the shoulder E, formed on the projecting end of the pin C, the bearing of the inner end of said sleeve against said shoulder forming a joint to prevent escape of the lubricant. The bearing-sleeve G is of somewhat greater length than the length of the projecting end of the pin, thereby forming a chamber J, in which the oil or other lubricant may be collected until entirely used up. The sleeve G is provided with an opening therethrough, adapted to receive therethrough a locking-key K, the edge of said locking-key being received in the peripheral groove F, formed in the pin C, thereby locking sleeve G against endwise movement, while permitting relative rotation of said sleeve and pin. The sleeve G is also provided with an opening L therethrough, through which the lubricant may be introduced to the bearing-surface of said sleeve, and in order to efficiently spread the lubricant the opening L terminates at its inner end in an extended seat or slot M, (see Fig. 3,) and in order to enable the opening L and seat M to be formed in the sleeve G without materially decreasing the strength thereof said sleeve may be provided with a projection or enlargement N, (see Fig. 1,) through which said opening L and in which said seat M is formed.

O P designate the forked arms of the pitman, these arms being threaded at their outer extremities, and Q designates the cap-piece, having its ends perforated to be received over the forked ends O P and nuts R, threaded upon the threaded ends of the forked arms, serving to hold the cap-piece Q in place. The yoke-arms, in conjunction with the cap-piece Q, constitute, in effect, clamping-jaws and together form a bearing-seat to be received over the exterior surface of the sleeve G. It will be observed that the locking-key K is held or clamped between the clamping-jaws which coöperate to form the bearing-seat for sleeve G, thus avoiding the necessity of providing any other or special means for locking said key in place, and hence affording a most simple and efficient as well as inexpensive locking device, and this I consider a most important feature of my invention. In order to prevent undue movement of sleeve G in the pitman-bearing thus formed therefor, a pin or stud R may be formed on one of these parts to coöperate with a seat or opening S, formed on the other, as clearly shown in full lines in Fig. 2 and in dotted lines in Fig. 3.

It will be observed that the opening L, through which the lubricant is supplied to the bearing of the crank-pin, is located between the wheel B and the point of connection of the pitman to the crank-pin. This special location and arrangement is advantageous, for the reason that in some types and constructions of mowing-machines the traction-wheels are of such diameter as to raise the driving-gearing for the knives to a considerable height. Consequently the pitman-driving shaft A is frequently inclined downwardly toward the wheel B in order to bring the eccentric-pin to a suitable height for operating the pitman. By reason of this inclined position of the pitman-driving shaft the crank and its bearing are also downwardly inclined. Therefore by locating the opening L at a point closely adjacent to the drive-wheel B the lubricant supplied therethrough while tending naturally to gravitate toward the lowermost end of the crank-pin when inclined downwardly will in so doing efficiently lubricate the bearing of said pin within bearing-sleeve G.

By the construction above described it will be seen that I provide an exceedingly simple, inexpensive, and economical construction of pitman connection wherein lubrication is efficiently provided for and the lubricant retained within the bearing.

Having now set forth the object and nature of my invention and a construction embodying the same, what I claim as new and useful and of my own invention, and desire to secure by Letters Patent, is—

1. In a pitman connection for mowing-machines, the combination with a crank-pin and pitman, of a cap-sleeve closed at one end and receiving the crank-pin in the other end thereof, said cap-sleeve being mounted in the end of said pitman and means carried by said sleeve and arranged to engage said pin to prevent relative endwise movement of said sleeve and pin, as and for the purpose set forth.

2. In a pitman connection for mowing-machines, the combination with a crank-pin, of a pitman-rod having a clamping-seat, a bearing cap-sleeve closed at one end and receiving longitudinally through the other end thereof said crank-pin, said cap-sleeve being received in said clamping-seat and means carried by said sleeve and arranged to engage said pin to prevent relative endwise movement of said sleeve and pin, all combined and arranged as and for the purpose set forth.

3. In a pitman connection for mowing-machines, the combination with a crank-pin having a peripheral groove and a pitman-rod having a clamping-seat, of a bearing cap-sleeve closed at the outer end thereof and receiving said crank-pin through the inner end thereof, said cap-sleeve provided with an opening therethrough to admit the lubricant to the bearing-surface thereof and adapted to be received in said clamping-seat and means carried by said sleeve arranged to operate in the groove in said pin to lock these parts against relative endwise movement, as and for the purpose set forth.

4. In a pitman connection for mowing-machines, an eccentric or crank pin having a shoulder or head formed on one end and its projecting end turned down to form a second shoulder, a cap-sleeve having a closed end and received upon the projecting end of said pin, and bearing against said second shoulder, a pitman-rod, and a clamping-seat carried thereby and adapted to receive said cap-sleeve, all combined and arranged as and for the purpose set forth.

5. In a pitman connection for mowing-machines, a crank-pin, a cap-sleeve mounted thereon, said cap-sleeve being closed at its outer end, there being a peripheral groove formed in said pin, a locking-key arranged to operate in said peripheral groove to lock said sleeve against endwise movement upon said pin, a pitman-rod, and a clamping-seat formed therein for receiving and supporting said cap-sleeve, all combined and arranged as and for the purpose set forth.

6. In a pitman connection for mowing-machines, a crank-pin having a shoulder or head formed on one end and its projecting end turned down to form a second shoulder, a bearing cap-sleeve arranged to be received upon said projecting end, said cap-sleeve being of greater length than the length of said projecting end, the outer end of said cap-sleeve being closed and the inner end forming a bearing against said second shoulder, an opening being formed through said cap-sleeve to admit a lubricant to the bearing-surface thereof, a pitman-rod, and means for clamping said pitman upon said bearing-sleeve, as and for the purpose set forth.

7. In a pitman connection for mowing-machines, the combination with a crank-pin, of a cap-sleeve therefor, said cap-sleeve being closed at one end and provided with a lubricating-opening therethrough, said lubricating-opening terminating in an enlarged recess on the inside surface of said cap-sleeve, means for locking said sleeve to said pin to prevent relative longitudinal movement thereof, a pitman and means for clamping said pitman upon said sleeve, as and for the purpose set forth.

8. In a pitman connection for mowing-machines, a crank-pin, a sleeve mounted thereon, there being a peripheral groove formed in said pin, a locking-key arranged to operate in said peripheral groove to lock said sleeve against endwise movement upon said pin, a pitman-rod, and means for clamping said rod upon said sleeve, all combined and arranged as and for the purpose set forth.

9. In a pitman connection for mowing-machines, a crank-pin, a sleeve mounted thereon, there being a peripheral groove formed in said pin, a locking-key arranged to operate in said peripheral groove to lock said sleeve against endwise movement upon said pin, a pitman-rod, a clamping-seat formed therein for receiving and supporting said sleeve, said clamping-seat also operating to inclose and retain said locking-key in place, as and for the purpose set forth.

10. In a pitman connection for mowing-machines, a crank-pin, a sleeve mounted thereon, there being a peripheral groove formed in said pin, a locking-key arranged to operate in said peripheral groove, a pitman-rod carrying a clamping-seat, a coöperating cap-piece, said cap-piece and bearing-seat coöperating to form a clamp adapted to receive said sleeve, said clamp also serving to inclose and lock said key in place, as and for the purpose set forth.

In witness whereof I have hereunto set my hand, this 3d day of July, 1902, in the presence of the subscribing witnesses.

FRANKLIN P. BURKHARDT.

Witnesses:
A. L. SPRINKLE,
E. H. KIMBARK.